(12) United States Patent
Roberts

(10) Patent No.: US 6,378,871 B1
(45) Date of Patent: Apr. 30, 2002

(54) MANAGEMENT TRAINING GAME

(76) Inventor: Ronald J. Roberts, 528 Elizabeth Dr., Eagleville, PA (US) 19403

( * ) Notice: Subject to any disclaimer, the term of this patent is extended or adjusted under 35 U.S.C. 154(b) by 0 days.

(21) Appl. No.: 09/768,429

(22) Filed: Jan. 24, 2001

(51) Int. Cl.[7] .............................. A63F 9/24; G09B 19/20
(52) U.S. Cl. ...................... 273/444; 434/237; 273/441; 273/445; 273/459
(58) Field of Search ................................ 273/440, 441, 273/444, 445, 459, 153 R; 434/236, 237

(56) References Cited

U.S. PATENT DOCUMENTS

| | | | | |
|---|---|---|---|---|
| 5,662,478 A | * | 9/1997 | Smith, Jr. .................... | 434/236 |
| 5,762,503 A | * | 6/1998 | Hoo et al. ................... | 434/237 |
| 5,795,155 A | * | 8/1998 | Morrel-Samuels .......... | 434/107 |
| 6,079,984 A | * | 6/2000 | Torres et al. ................ | 273/440 |
| 6,254,101 B1 | * | 7/2001 | Young ......................... | 273/242 |

* cited by examiner

Primary Examiner—Raleigh W. Chiu
(74) Attorney, Agent, or Firm—William H. Eilberg

(57) ABSTRACT

A management training game is played with vehicles that are moved around a playing area. The playing area is a large rectangle having a plurality of labeled blocks. Each team includes a leader, who rides on the vehicle, and rope controllers, who manipulate ropes connected to the vehicle, from outside of the playing area. Each team leader receives an assigned route, namely a list of blocks to which the vehicle must travel. Each team then attempts to move its vehicle along its assigned route, in a limited time, and without encountering paralysis due to interference with other vehicles or ropes. The game provides the players with an object lesson in the value of communication, creative thinking, leadership, teamwork, and cooperation, in solving difficult problems.

22 Claims, 2 Drawing Sheets

| 1 | 2 | 3 | 4 |
|---|---|---|---|
| 5 | 6 | 7 | 8 |
| 9 | 10 | 11 | 12 |
| 13 | 14 | 15 | 16 |

Fig. 1

MANAGEMENT TRAINING GAME

BACKGROUND OF THE INVENTION

The present invention is a game that is intended to train managers, sales persons, and/or customer service personnel, of organizations large and small, to think more creatively, and to cooperate more effectively with others, in managing the organization.

Large corporations often have many departments, and may employ thousands, or even hundreds of thousands, of persons. The organizational charts describing such businesses can become very large and complex, and a manager in one department is usually unaware of the circumstances of his or her counterparts in another department. Indeed, the various departments or divisions of a large corporation may function autonomously, and may even behave as competitors of each other.

The management of large organizations, as well as relatively small organizations, such as business corporations, therefore requires the coordination of effort among various divisions, departments, and sub-sections, such that all components of the organization operate in a manner that maximizes the benefit for the organization as a whole.

Many corporate managers are taught to view business as a competitive sport. Such managers adopt an aggressive attitude towards the management of their organizations, and may be determined to "win at all costs". Such an attitude may have positive effects, in motivating the manager to exert maximum effort. But this attitude also may mean that a greater benefit to the larger organization could be lost due to an individual manager's excessive desire to achieve a specific goal for his or her department. In an efficiently managed organization, all parts of the organization operate harmoniously, each being aware of the needs and desires of the other, and each being aware that working together can maximize profit for all.

The present invention is a game that is intended to train managers and/or other personnel, especially those working in corporations or other organizations, in an entertaining and non-threatening way, to think and plan more creatively in managing their organizations.

SUMMARY OF THE INVENTION

The present invention is a game that uses a large, flat playing area. The playing area is preferably square or rectangular, and is subdivided into smaller rectangles or blocks, each block being labeled with a number or other symbol. The game is played by a plurality of teams, each team preferably including five members.

With each team there is associated a wheeled cart, called a Grid Mobile, which fits within the space defined by any of the blocks. One member of the team is designated the Grid Master. The Grid Master sits on the Grid Mobile, while the other members of the team, called Rope Controllers, stand outside the boundary of the playing area, and hold ropes connected to their Grid Mobile. The Grid Mobile can therefore, in theory, be moved to any block within the playing area, by appropriate tugs on the rope by the Rope Controllers.

For each round of play, each Grid Master receives a card showing an assigned itinerary for his or her Grid Mobile. An itinerary comprises a sequence of numbers, indicating that the Grid Mobile must travel to the blocks identified by those numbers, in the indicated order. The participants are told, initially, that the object of the game is to move the Grid Mobiles to all of the blocks in their respective assigned routes, in the shortest amount of time, without experiencing paralysis of movement. A time limit is normally assigned, so that if no team finishes its route within the time limit, the first round of the game ends without resolution.

In their initial attempt at playing the game, the teams generally find themselves in a state of immobilization, or paralysis, a condition wherein one or more Grid Mobiles are blocked by other Grid Mobiles, and/or by ropes which become hopelessly entangled. The game may be terminated when such a condition of paralysis occurs. The participants eventually learn that if they try to win "at all costs", they will cause everyone to lose. Only by coordination of efforts, within a team and among the different teams, will it be possible to reach a solution where all teams can complete their routes without paralysis. The set of all of the teams, comprising all participants in the game, is a metaphor for a larger organization, such as a business corporation, a school, or other entity. The game therefore teaches its players the value of creative thinking, strategic planning, communication, cooperation, and leadership.

The present invention therefore has the primary object of providing a game which trains its players to improve their management skills.

The invention has the further object of teaching the benefits of creative thinking, strategic planning, communication, cooperation, and leadership, in the management of an organization.

The invention has the further object of training managers, sales persons, and/or customer service personnel, of large, medium, and small organizations, such as corporations, to do their jobs more effectively.

The invention has the further object of providing management training in an entertaining and non-threatening manner.

The invention has the further object of providing training as discussed above, wherein the participants have an opportunity to improve their performance during a given session.

The invention has the further object of providing apparatus for playing a game which trains employees of large and small organizations to perform more effectively.

The reader skilled in the art will recognize other objects and advantages of the present invention, from the following brief description of the drawings, the detailed description of the invention, and the appended claims.

BRIEF DESCRIPTION OF THE DRAWINGS

FIG. 1 provides a plan view of the playing area used in playing the game of the present invention.

DETAILED DESCRIPTION OF THE INVENTION

Figure 2:
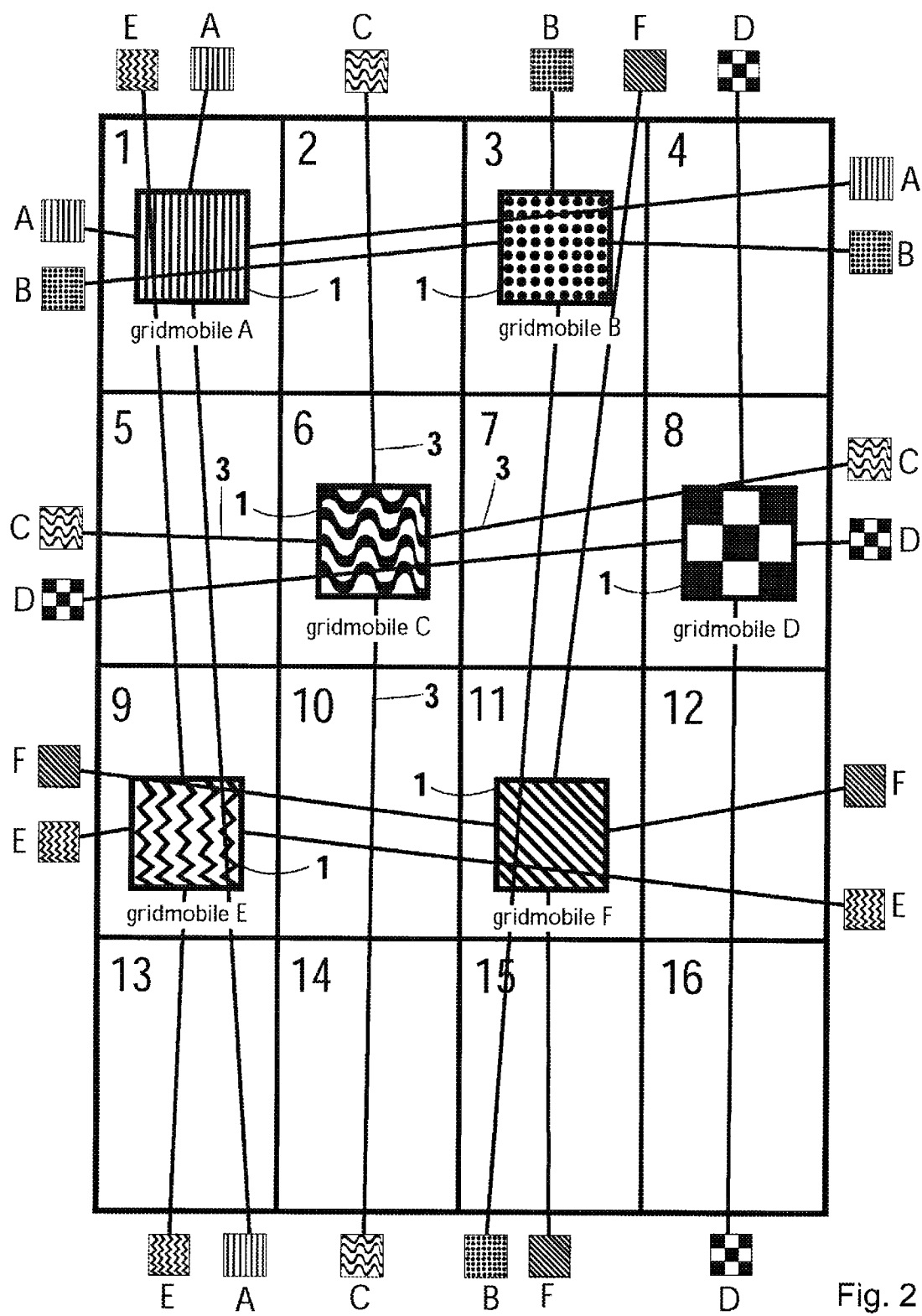
FIG. 2 provides a plan view, similar to that of FIG. 1, but also showing the various game devices on the playing area.

The game of the present invention is preferably played on a large, flat, rectangular area, typically about 20–40 feet wide and 20–40 feet long. Examples of spaces that can be used include one-half of a tennis court, or an equivalent space in a ballroom (preferably having a low-pile commercial carpet or no carpet at all), a cement floor in a conference center or other building, or a paved parking lot. The dimensions given above are stated by way of example, and are not intended to limit the scope of the invention. In general, the playing area should be large enough to make it difficult for a small team in one part of the playing area to see and communicate with other small teams in other parts of the playing area.

Figure 1:
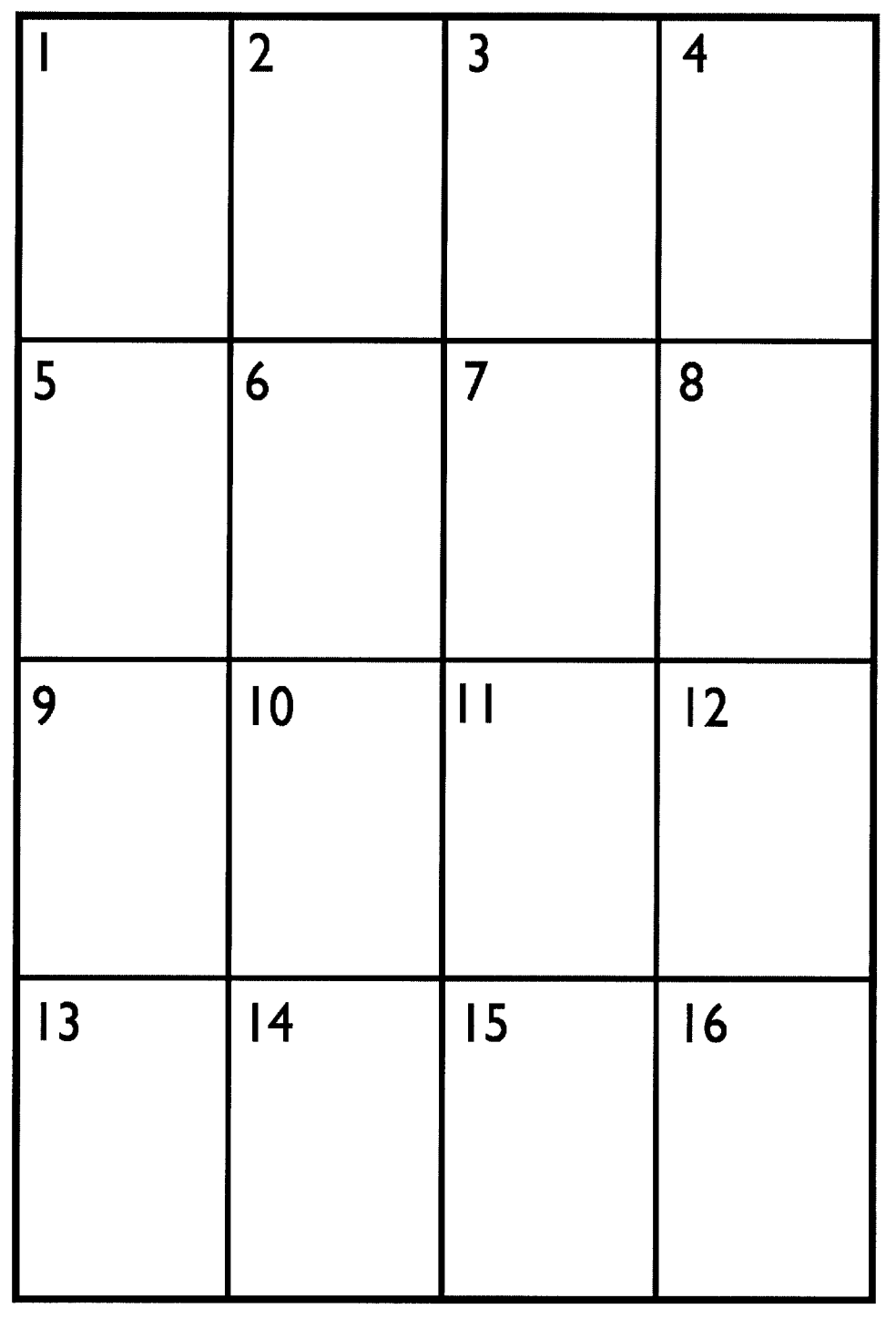

The perimeter of the playing area is marked off, preferably by the use of removable masking tape, lime, chalk, or the like. Within the interior of the playing area, 16 smaller rectangles, or blocks, are defined by placing delineators (also comprising removable masking tape, lime, chalk, or an equivalent) connecting opposite sides of the playing area. The result is the playing area shown in FIG. 1. For convenience, the four sides of the playing area are designated as north, south, east, and west, although these designations are, in general, unrelated to actual compass headings. The number of blocks could be varied by varying the number of delineators. Thus, for example, there could be twelve blocks or nine blocks, or some other number.

The game is played by 4–8 small teams, each small team having five members. The set of all the small teams comprises one big team, although the latter fact may not be initially apparent to the participants. The number of small teams depends on the total number of participants in the game.

Each small team is associated with a wheeled cart, which is called a "Grid Mobile", and which is intended to traverse the playing area along a prescribed route. One player of each small team, designated as the "Grid Master", rides on the Grid Mobile, The Grid Master may be selected by the team members, or by a coordinator who directs the overall game. It is recommended, but not required, that the smallest person on the team be selected as the Grid Master, so as to make it easier to move the Grid Mobile with the Grid Master seated thereon. The other four players of the small team, known as Rope Controllers, stand immediately outside the boundary of the playing area, and each such player manipulates a rope that is attached to the Grid Mobile associated with his or her team.

The Rope Controllers must remain outside of the boundary of the playing area at all times. Also, the Rope Controllers must remain on opposite sides of the playing area, i.e. 180 degrees apart, at any given time. If any Rope Controller steps inside the playing area at any time, the game stops temporarily, until the offending Rope Controller is once again outside the playing area. An exception to the 180-degree rule could be made where, as described later, there are only three Rope Controllers for a team. In this case, some of the Rope Controllers may need to be 90 degrees, or even 60 degrees, apart so as to be able to move their Grid Mobile in a desired manner.

The Grid Masters must remain on their Grid Mobiles at all times. If a Grid Master falls off for any reason, the Rope Controllers associated with that Grid Master must stop their play until the Grid Master has returned to the Grid Mobile.

One player of the team stands on the north side of the playing area, another on the south side, another on the east side, and another on the west side. All of the Rope Controllers must start the game with the ropes in their hands. However, after the game has begun, each player is free to hold the rope or not; indeed, a Rope Controller may even drop his or her rope entirely, at any time, and for any length of time.

While holding the rope, each Rope Controller can choose to pull on the rope, or not to pull on the rope. It therefore follows that each Grid Mobile, unless obstructed by another Grid Mobile, or by a rope attached to another Grid Mobile, can be made to travel anywhere within the playing area, by appropriate combinations of pulls on ropes by Rope Controllers associated with that Grid Mobile.

The Grid Mobiles for all of the small teams are arranged on the playing area. The small teams are designated by letters (i.e. A, B, C, D, E, . . . ), as are the associated Grid Mobiles. Each Grid Mobile is placed initially on a pre-assigned block. For example, Grid Mobile A could start in Block 1, Grid Mobile B could start in Block 3, Grid Mobile C could start in Block 5, and so on.

Before the start of the game, each Grid Master receives a card bearing a list of numbers in a particular order. These numbers represent an assigned route for the Grid Mobile. For example, if the card contains the numbers 1 2 6 5 9 14 16, then the Grid Mobile must go to Blocks 1, 2, 6, 5, 9, 14, and 16, in the stated order, to complete the assigned route. In general, each team receives a different card, and thus is assigned a different route. In each team, only the Grid Master knows the route. The Grid Master communicates orally with the Rope Controllers of his or her team, telling the Rope Controllers the next destination of the Grid Mobile. The Grid Master may also communicate by non-verbal means, such as by hand signals, as needed. The Rope Controllers may talk to the Grid Master, and to other Rope Controllers as needed, and may also use non-verbal signals.

The participants of the game are told that the object of the game is to move their Grid Mobiles to all of the blocks in their respective assigned routes, in the shortest possible time, without experiencing paralysis of movement. The participants will usually misinterpret the latter instruction to mean that the first team to complete its route is the winner. Each small team may then reach a consensus, and create a strategic plan for "winning", by analyzing the best way to move the cart along the assigned route in the shortest time possible, while keeping the Grid Master in the seat. In practice, the game will be accompanied by much confusion and shouting, as all of the Grid Masters yell instructions to their respective Rope Controllers, and the Rope Controllers yell to their teammates and to their Grid Masters.

Since all of the small teams are trying to complete their assigned routes on the same playing area at the same time, conflicts are likely. Indeed, a condition of paralysis of movement can occur, wherein two or more Grid Mobiles obstruct each other, and/or ropes from different Grid Mobiles become hopelessly entangled. In one embodiment, the game automatically terminates when paralysis occurs. In another embodiment, the game is played with a time limit, so that if a condition of paralysis occurs, and the players are unable to resolve the conflict reasonably quickly, the time limit will be reached before any Grid Mobile has completed its route. In either case, no one wins, because no Grid Mobile has completed its assigned route.

The deeper purpose of the game is therefore to promote teamwork among the various small teams, and to show the participants that they are really part of a larger team. If any one small team tries to "win" at all costs, and to complete the route assigned to its Grid Mobile without any regard to the Grid Mobiles of the other teams, paralysis of movement is likely, and no one wins. If all of the small teams think creatively, and develop a solution that takes all of the teams into consideration, then paralysis can be avoided, and the larger team operates with efficiency and success, and completes the assigned task. It turns out that the only way to prevent paralysis is for the participants to plan strategically, and to act as a unified big team. Clearly, the larger team, i.e. the total assembly of participants, is analogous to the larger organization (corporation or other entity) of which the participants are members.

An objective of the game is therefore to manage the input and output of information, while facing physical limitations imposed by other teams. Another important objective is to enable the participants to observe the power that small teams have on the success of the big team. The game of the present invention therefore seeks to promote team awareness, communication, creative thinking, leadership, strategic planning, and time management.

The minimum number of Grid Mobiles, for effective play, is four. The maximum number (for a playing area of the size described in the above example) is usually seven or eight. If fewer than four Grid Mobiles are used, the game will provide little challenge, and if more than seven or eight are used, the game becomes so complex that no one can move or win. The minimum and maximum number of Grid Mobiles will change according to the dimensions of the playing area.

In the event that the total number of participants is not an integral multiple of five, it is possible to have only four members on one or more of the small teams, such as by using only three Rope Controllers on three sides of the playing area.

FIG. 2 symbolically illustrates an arrangement wherein there are six Grid Mobiles 1. FIG. 2 shows each Grid Mobile with a different pattern. The figure also shows four ropes 3 attached to each Grid Mobile, and these ropes terminate in labels which correspond to the patterns identifying the corresponding Grid Mobile. For example, Grid Mobile B sits in Block 3, and is attached to four ropes, the ends of which are labeled "B" and bear the same pattern used to identify Grid Mobile B. The Rope Controllers, not shown in the figure, would grasp the ends of the ropes for their respective Grid Mobiles.

In a preferred embodiment, a game session may comprise several rounds, the first round being relatively easy, and the second and subsequent rounds being more advanced. The following tables show, in compact form, the contents of hypothetical cards that can be given to each Grid Master. The table labeled Exercise No. 1 represents eight hypothetical cards in a relatively easy game. The table labeled as Exercise No. 2 shows eight hypothetical cards for more difficult games. Within each group (i.e. within Exercise 1 or 2), all of the cards are considered to represent routes of approximately equal difficulty. It is helpful to have more cards than necessary, within a given level of difficulty, so that multiple rounds can be played, if desired, without repeating the same pattern used in a previous round. The invention is not limited to the use of these particular routes; many other routes can be designed, within the scope of the invention.

Exercise No. 1

| A | B | C | D | E | F | G | H |
|---|---|---|---|---|---|---|---|
| 1 | 3 | 6 | 8 | 9 | 11 | 14 | 16 |
| 2 | 4 | 5 | 7 | 10 | 12 | 13 | 15 |
| 6 | 8 | 1 | 3 | 14 | 16 | 9 | 11 |
| 5 | 7 | 2 | 4 | 13 | 15 | 10 | 12 |
| 9 | 6 | 5 | 7 | 15 | 16 | 13 | 8 |
| 14 | 2 | 10 | 3 | 11 | 12 | 5 | 4 |
| 16 | 5 | 13 | 12 | 10 | 6 | 3 | 8 |

Exercise No. 2

| A | B | C | D | E | F | G | H |
|---|---|---|---|---|---|---|---|
| 5 | 6 | 7 | 8 | 9 | 10 | 11 | 12 |
| 9 | 10 | 11 | 12 | 5 | 6 | 7 | 8 |
| 14 | 13 | 16 | 15 | 2 | 1 | 4 | 3 |
| 3 | 1 | 2 | 4 | 11 | 12 | 9 | 10 |
| 13 | 8 | 16 | 5 | 4 | 9 | 12 | 1 |
| 15 | 6 | 14 | 7 | 2 | 11 | 10 | 3 |
| 4 | 12 | 1 | 9 | 13 | 5 | 8 | 16 |
| 5 | 14 | 8 | 15 | 12 | 3 | 2 | 9 |
| 8 | 2 | 5 | 3 | 9 | 15 | 14 | 12 |
| 1 | 7 | 4 | 6 | 16 | 10 | 11 | 13 |

For example, if in Exercise No. 1, a Grid Master receives Card B, the card will instruct the Grid Master to travel to Blocks 3, 4, 8, 7, 6, 2, and 5 (in that order). If, in Exercise No. 2, a Grid Master receives Card G, the card will instruct the Grid Master to travel to Blocks 11, 7, 4, 9, 12, 10, 8, 2, 14, and 11 (in that order).

Preferably, only one card is given to each Grid Master at one time, and the used cards are collected before new cards are distributed.

Each round is intended to take about 5–10 minutes. The game is directed by a coordinator, who is not a participant, and who acts as the leader of the event. The coordinator may tell the players, in advance, of the expected length of the game. If the players are fast in the first round, they will probably need extra time in the second round, due to the increased level of difficulty. Teams should be debriefed for about 15 minutes between each round, as will be described below.

In the last game played in a session, the coordinator should allow the game to continue until all of the teams have completed their assigned routes. The coordinator may apply pressure by telling the players that they have very little time left, but should allow the game to finish so that the participants will go home with a positive feeling about the experience.

If a team does well in a first round, the coordinator may give that team a much more difficult card for the next round. If a team does not do well, or if it fails, in the first round, the coordinator may give that team a set of easy cards again, but preferably gives them different cards from those assigned originally. For example, if one gives them cards A through D in the first round, one can give them cards E through H in the second round.

If a team does particularly well in the first round, then one can give the team a card from the more difficult exercise for the second round.

A goal of the coordinator is to insure that each team experiences process breakdown or paralysis at least once. Although such process breakdown is disheartening, the players will not learn much from the game if they do not experience paralysis, and do not have a chance to reflect on the best strategies for playing the game.

If a team fails miserably in the second round (which normally happens if the players do not receive extensive preparation), then the coordinator may stop the game and give the players a thorough debriefing or brainstorming session, with the coordinator giving hints when necessary. The coordinator may also engage in Socratic dialog, prodding the participants to develop their own solutions to the problem of how to play the game, and indicating when the players have discovered the correct principles of play.

If a team does very well in the second round, the coordinator may assign that team a set of difficult cards for a third round, without giving any further hints. If more than one game of the present invention is being played in a nearby location, it is preferable that a team that has done very well not talk to other teams that are playing the game.

If a team is in the middle of any game, but especially a more difficult game, and the team is having difficulty, the coordinator may stop the game by blowing a whistle. The coordinator may then urge the participants to debrief, asking them to consider some solutions to the problem, and to plan a better strategy.

The following strategies may be used to improve the performance of a team. The coordinator may supply some or all of these as hints, or may try to elicit them from the participants during a debriefing session.

One strategy is for one Grid Mobile to move at a time, independently of the other teams. In fact, the Rope Controllers of all teams but one can drop their ropes, allowing one Grid Mobile to move unimpeded at any one time. Of course, this strategy requires coordination and cooperation among the various teams. But there is nothing in the rules of the game that prevents the small teams from communicating with each other, and at least some such communication is essential.

Another strategy is to appoint, either explicitly or by default, a primary leader of the entire group, wherein the primary leader acts as overall coordinator.

In all of the above strategies, each team must be willing to subordinate itself to the other teams, and to forego winning as a small team.

Another strategy is to have the Rope Controllers on the north and south sides move to the positions of the Rope Controllers on the east and west (or vice versa), thus maintaining the condition wherein Rope Controllers remain 180° out of phase. The latter arrangement simplifies the game dramatically, because only two ropes need to move at once.

In directing the playing of the game, it is preferred that the coordinator not allow the participants to spend too much time thinking about the game before playing it. The educational value of the game is maximized if the players play the game with only the minimal instruction necessary. In this way, the players are likely to find themselves in a state of immobilization or paralysis, and are then forced to evaluate alternative strategies, which will teach them the advantages of creative planning and cooperation.

In debriefing the participants, the coordinator should emphasize the fact that most individuals are inclined to solve problems by either "matrix" thinking, or by linear sequential thinking. One object of the present game is to teach the players to integrate the two types of thinking, so that the players become masters of their situation, and not slaves to any one type of thought process. The present game seeks to teach the players that the power of linear sequential thinking, combined with matrix thinking, amplifies their abilities many times. The players of the game also learn to balance process orientation with task/goal orientation; that is, they learn to focus not only on accomplishing a specific task, but also on the larger issue of how the larger organization can be made to function efficiently.

The following is a suggested method of debriefing the participants of the game of the present invention. Presented below are sample debriefing questions, to be asked by the coordinator, in each of the several categories shown. As indicated below, some of these questions can be asked after the first round, some can be asked after the second round, and some can be asked after both rounds.

Teamwork (to be asked after Round 1)

How did you identify as a team in the very beginning?

Did you use all the resources that were available as a team?

Communications (to be asked after Round 1 and Round 2)

How did you communicate with each other in your small groups?

What other communications did you conduct as a team?

In what way did you communicate with each other as a big team?

Leadership (to be asked after Round 2)

Who was in charge of your team? Was there a designated leader?

How effective was the leadership in your small group?

How effective was the leadership in the big group?

What can you do to improve the effectiveness of the leadership?

Strategic Planning (to be asked after Round 2)

Who was in charge of the small group?

How effective was your planning?

If you had no formal plan, how were decisions made?

How was planning carried out in the big group?

If there was no clearly defined planning in the big group, what can you do now to improve planning for the future?

The questions presented above are intended only as examples, and are not intended to limit the invention. Other types of questions are possible, and may be developed by a skillful coordinator who has gained extensive experience in debriefing teams that have played this game.

The present invention therefore provides management training in an entertaining and non-threatening manner. The coordinator tries to insure that the participants are having fun, in addition to learning the subtle lessons inherent in the game. Because the game is only symbolic of realistic management problems, the game environment is not threatening to any given participant, but it still gives each participant a learning experience that can be applied in the real world. Furthermore, by repeating the game for several rounds, the participants can be taught to improve their performance, and can leave the session with a feeling of accomplishment.

The game of the present invention can be modified in many ways. The playing area need not be exactly as shown in the figures, but instead it could be a square, or even some completely different shape. If rectangles are used, their aspects (i.e. the ratios of lengths of one side to another) could be varied. The number of blocks within the playing area could be changed. The blocks need not be marked with masking tape or other temporary marker, but could be delineated by any other means. Indeed, it is possible to provide a permanent playing area, and to paint the boundaries onto the playing surface. The invention is also not limited to any particular structure for the Grid Mobiles; any vehicle can be used, as long as it can be easily moved from one block to another. The size of the playing area could be modified; a larger playing area would accommodate a larger number of teams. The blocks could be labeled by letters or other symbols, instead of by numbers. These and other similar modifications, which will be apparent to the reader skilled in the art, should be considered within the spirit and scope of the following claims.

What is claimed is:

1. A method of playing a game, comprising:
   a) providing a playing area having a plurality of labeled blocks,
   b) arranging a plurality of vehicles on selected blocks, each vehicle being connected to a plurality of ropes,
   c) forming teams associated with each vehicle, each team including a leader who rides on the vehicle and at least one rope controller who manipulates the ropes from outside a boundary of the playing area,
   d) providing an assigned route, within the playing area, to each leader of each team, and
   e) moving each vehicle along its assigned route.

2. The method of claim 1, wherein step (d) comprises providing a list of blocks, in a predetermined order, wherein the assigned route comprises traveling to the blocks in said list, in said predetermined order.

3. The method of claim 1, further comprising setting a time limit for completion of play.

4. The method of claim 1, further comprising the step of allowing communication between the leader and rope controller of each team.

5. The method of claim 4, further comprising the step of allowing communication among members of different teams.

6. The method of claim 1, wherein step (e) comprises pulling on one or more ropes connected to said each vehicle, so as to move the vehicle to a desired block.

7. The method of claim 1, wherein an object of the game is to move the vehicles to all of the blocks in their respective assigned routes, in a shortest possible time.

8. The method of claim 7, wherein a further object of the game is to move the vehicles to all of the blocks in their respective assigned routes without allowing any vehicle to become immobilized by another vehicle or by any of the ropes.

9. The method of claim 1, wherein step (d) comprises selecting routes from a group of easy routes and from a group of difficult routes.

10. The method of claim 1, wherein the game is played in a plurality of rounds, and wherein, for each round, step (d) is performed by selecting different routes.

11. The method of claim 10, further comprising selecting routes of varying difficulty for different rounds.

12. The method of claim 1, wherein each team includes a plurality of rope controllers.

13. A method of training a group of employees, comprising:
   a) dividing the group into teams, each team being associated with a vehicle, each vehicle being placed on a playing area having a plurality of blocks, each vehicle being connected to at least one rope,
   b) assigning a route to a leader of each team, each route comprising a list of blocks to which the vehicle must travel, and
   c) manipulating the ropes so as to move the vehicles along their assigned routes.

14. The method of claim 13, further comprising stipulating that an object of the game is for said teams to complete their assigned routes in the shortest possible time, without experiencing paralysis.

15. The method of claim 14, further comprising performing steps (a) through (c) a plurality of times, and selecting different routes for each vehicle, each time that step (b) is performed.

16. The method of claim 15, further comprising performing step (b) a plurality of times, with routes of varying difficulty.

17. A method of training a group of employees, comprising:
   a) dividing the group into teams, each team being associated with a vehicle, each vehicle being placed on a playing area having a plurality of blocks,
   b) assigning a route to a leader of each team, each route comprising a list of blocks to which the vehicle must travel, and
   c) manipulating the vehicles so as to move the vehicles along their assigned routes.

18. Apparatus for playing a management training game, comprising:
   a) a playing area, the playing area defining a plurality of labeled blocks,
   b) a plurality of vehicles, each vehicle being sized to fit within any of said blocks, each vehicle being connected to at least one rope, each vehicle being movable within the playing area, and
   c) a plurality of lists, each list comprising a plurality of labels pertaining to said blocks, each list defining an assigned route of travel for a particular vehicle.

19. The apparatus of claim 18, wherein the playing area is generally flat and rectangular, and wherein the blocks are rectangles formed within the playing area.

20. The apparatus of claim 19, wherein the blocks are labeled by numbers.

21. The apparatus of claim 18, wherein each vehicle is connected to a plurality of ropes.

22. The apparatus of claim 21, wherein the ropes are sufficiently long to allow the vehicle to be manipulated, by the ropes, from outside a boundary of the playing area.

* * * * *